(12) United States Patent
Fukushima

(10) Patent No.: US 11,820,175 B2
(45) Date of Patent: Nov. 21, 2023

(54) TYRE

(71) Applicant: SUMITOMO RUBBER INDUSTRIES, LTD., Kobe (JP)

(72) Inventor: Kazuki Fukushima, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 826 days.

(21) Appl. No.: 16/692,829

(22) Filed: Nov. 22, 2019

(65) Prior Publication Data

US 2020/0189321 A1 Jun. 18, 2020

(30) Foreign Application Priority Data

Dec. 13, 2018 (JP) .................................. 2018-233471

(51) Int. Cl.
*B60C 11/03* (2006.01)

(52) U.S. Cl.
CPC ....... *B60C 11/03* (2013.01); *B60C 2011/0344* (2013.01); *B60C 2011/0346* (2013.01); *B60C 2200/10* (2013.01)

(58) Field of Classification Search
CPC ..... B60C 2200/10; B60C 11/03; B60C 11/04; B60C 2011/0346; B60C 2011/0344
USPC ................................................ D12/569–572
See application file for complete search history.

(56) References Cited

U.S. PATENT DOCUMENTS

| | | | | |
|---|---|---|---|---|
| 4,388,960 A | * | 6/1983 | Wada | B60C 11/0306 152/209.17 |
| D861,579 S | * | 10/2019 | Ichiryu | D12/570 |
| D863,209 S | * | 10/2019 | Ichiryu | D12/570 |
| 2005/0098250 A1 | * | 5/2005 | Ito | B60C 11/13 152/209.11 |
| 2017/0239999 A1 | | 8/2017 | Yamaguchi et al. | |

(Continued)

FOREIGN PATENT DOCUMENTS

| | | |
|---|---|---|
| JP | 2005-138807 A | 6/2005 |
| WO | WO 2017/170562 A1 | 10/2017 |
| WO | WO 2017/170788 A1 | 10/2017 |

OTHER PUBLICATIONS

Extended European Search Report for European Application No. 19206478.0, dated Apr. 20, 2020.

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A tyre includes a crown main groove formed by unit patterns. Each of the unit patterns includes a first inclined element, a second inclined element, a first bent element, and a second bent element. The first inclined element extends obliquely. The second inclined element extends obliquely in a direction opposite to the first inclined element. The first bent element extends so as to connect between the first inclined element and the second inclined element. The second bent element is connected with the second inclined element. The first bent element is bent so as to be convex toward the first tread edge without having a component extending in parallel with the tyre circumferential direction. The second bent element is bent so as to be convex toward the second tread edge without having the component extending in parallel with the tyre circumferential direction.

19 Claims, 5 Drawing Sheets

(56) References Cited

U.S. PATENT DOCUMENTS

2020/0189320 A1\* 6/2020 Otani ................ B60C 11/032
2020/0189324 A1\* 6/2020 Ichiryu ............... B60C 11/13

\* cited by examiner

TYRE

TECHNICAL FIELD

The present invention relates to a tyre.

BACKGROUND ART

Japanese Unexamined Patent Application Publication No. 2005-138807 describes a tyre provided with a wavy groove extending continuously in a tyre circumferential direction at the center of a tread surface. The wavy groove includes straight portions arranged straight along the tyre circumferential direction and oblique portions connected with the straight portions and arranged so as to obliquely cross an equatorial plane. In the tyre configured as such, in the case in which a band ply constituting the tyre extends along the tyre circumferential direction, the extending direction of the oblique portions is different from the extending direction of band cords of the band ply, for example. Thereby, in the oblique portions, deflection during running is prevented, therefore, repeated distortion is decreased, thereby, generation of so-called TGC (Tread Groove Cracking) is suppressed. Further, it is supposed that the wavy groove including the straight portions and the oblique portions configured as such does not cause a big difference in noise level between the sound generated during straightaway driving and the sound generated during cornering. Thereby, in the transition between straightaway driving and cornering, the change in the noise becomes smooth, which gives the driver a smooth driving feeling, therefore, noise performance is maintained high.

SUMMARY OF THE INVENTION

In the tyre described above, when running on a so-called rain groove road in which grooves for drainage are provided, the grooves and the straight portions get engaged with each other, for example. Thereby, it is possible that stability during lane change is low in this type of tyres. Further, in the case in which the band ply extends along the tyre circumferential direction, it is possible that the TGC is likely to occur in the straight portions, for example.

The present invention was made in view of the above, and a primary object thereof is to provide a tyre which improves steering stability performance and suppresses occurrence of the TGC while maintaining the noise performance.

In one aspect of the present invention, a tyre includes a tread portion including a first tread edge and a second tread edge, wherein the tread portion includes a crown main groove extending continuously in a tyre circumferential direction, the crown main groove is formed by unit patterns arranged repeatedly in the tyre circumferential direction, each of the unit patterns is formed by a first inclined element, a second inclined element, a first bent element, and a second bent element, the first inclined element extends so as to cross a first tyre circumferential direction line obliquely, the second inclined element extends so as to cross the first tyre circumferential direction line obliquely in a direction opposite to the first inclined element, the first bent element extends so as to connect between the first inclined element and the second inclined element, the second bent element is connected with the second inclined element, each of the first inclined element and the second inclined element has a larger angle with respect to the tyre circumferential direction and a smaller length in the tyre circumferential direction than each of the first bent element and the second bent element, the first bent element is bent so as to be convex toward the first tread edge without having a component extending in parallel with the tyre circumferential direction, and the second bent element is bent so as to be convex toward the second tread edge without having the component extending in parallel with the tyre circumferential direction.

In another aspect of the invention, it is preferred that each of the first bent element and the second bent element includes a first portion inclined to one side with respect to the tyre circumferential direction and a second portion inclined to a side opposite to the first portion.

In another aspect of the invention, it is preferred that each of the first portion and the second portion extends linearly.

In another aspect of the invention, it is preferred that each of the first portion and the second portion extends in an arc shape.

In another aspect of the invention, it is preferred that an angle with respect to the tyre circumferential direction of each of the first portion and the second portion is 5 degrees or more and 20 degrees or less.

In another aspect of the invention, it is preferred that the first tyre circumferential direction line is positioned on a tyre equator.

In another aspect of the invention, it is preferred that the tread portion includes a middle main groove arranged on an outer side in a tyre axial direction of the crown main groove and extending continuously in the tyre circumferential direction, the middle main groove is formed by unit patterns arranged repeatedly in the tyre circumferential direction, each of the unit patterns of the middle main groove is formed by a middle first inclined element, a middle second inclined element, a middle bent element, and a linear element, the middle first inclined element extends so as to cross a second tyre circumferential direction line obliquely, the middle second inclined element extends so as to cross the second tyre circumferential direction line obliquely in a direction opposite to the middle first inclined element, the middle bent element extends so as to connect between the middle first inclined element and the middle second inclined element, the linear element is connected with the middle second inclined element, the middle bent element is bent so as to be convex toward the crown main groove, and the linear element extends along the tyre circumferential direction.

In another aspect of the invention, it is preferred that the middle bent element includes a middle first portion inclined to one side with respect to the tyre circumferential direction and a middle second portion inclined to a side opposite to the middle first portion.

In another aspect of the invention, it is preferred that each of the middle first portion and the middle second portion extends linearly.

In another aspect of the invention, it is preferred that an angle with respect to the tyre circumferential direction of each of the middle first portion and the middle second portion is 5 degrees or more and 20 degrees or less.

In another aspect of the invention, it is preferred that a groove width of the linear element is the smallest among groove widths of the crown main groove and the middle main groove.

In another aspect of the invention, it is preferred that a groove width of the linear element is 5% or more and 30% or less of a groove width of the middle bent element.

DESCRIPTION OF THE PREFERRED EMBODIMENT

An embodiment of the present invention will now be described below in detail in conjunction with accompanying drawings.

Figure 1:
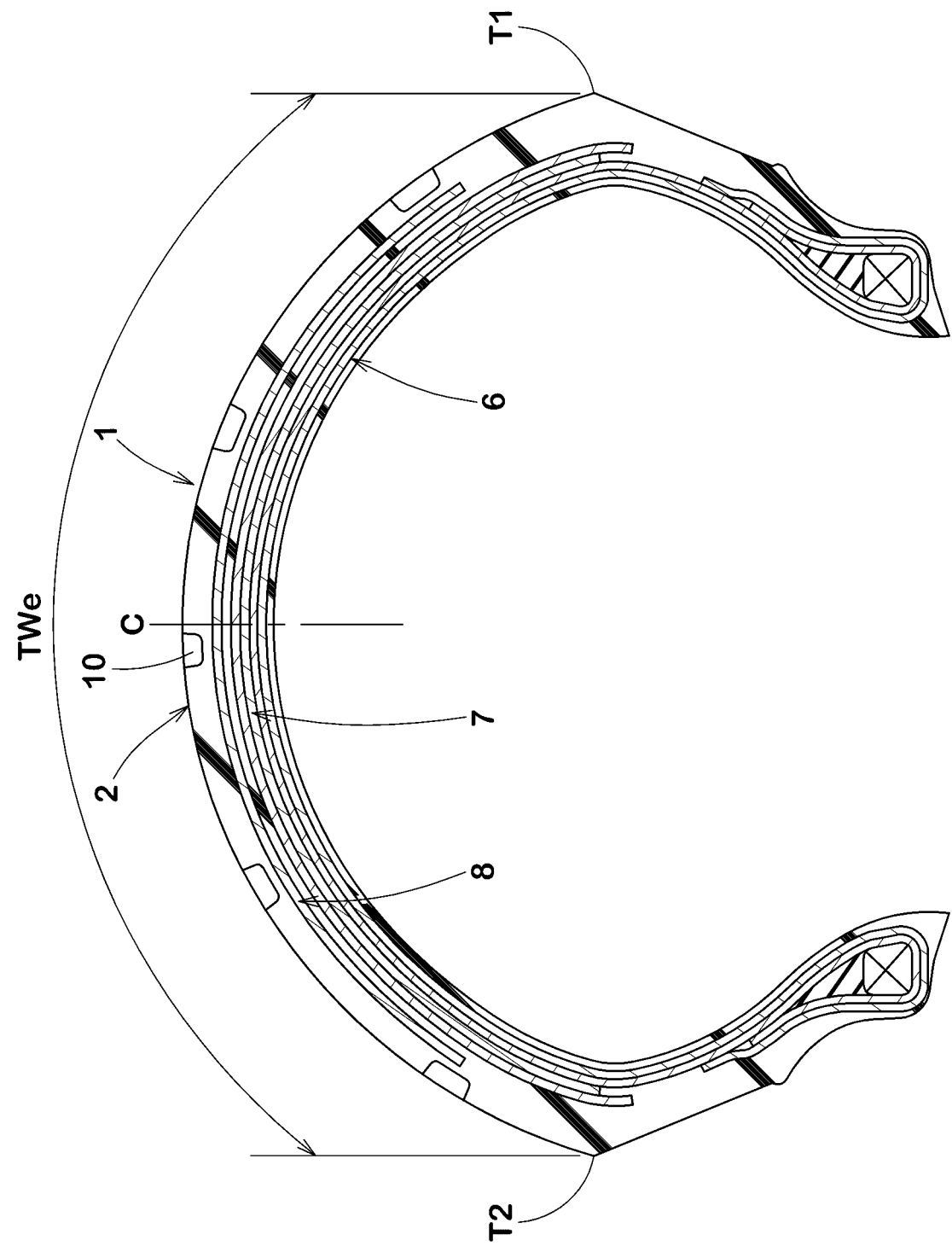
FIG. 1 is a lateral cross-sectional view of a tyre according to an embodiment of the present invention.
Figure 2:
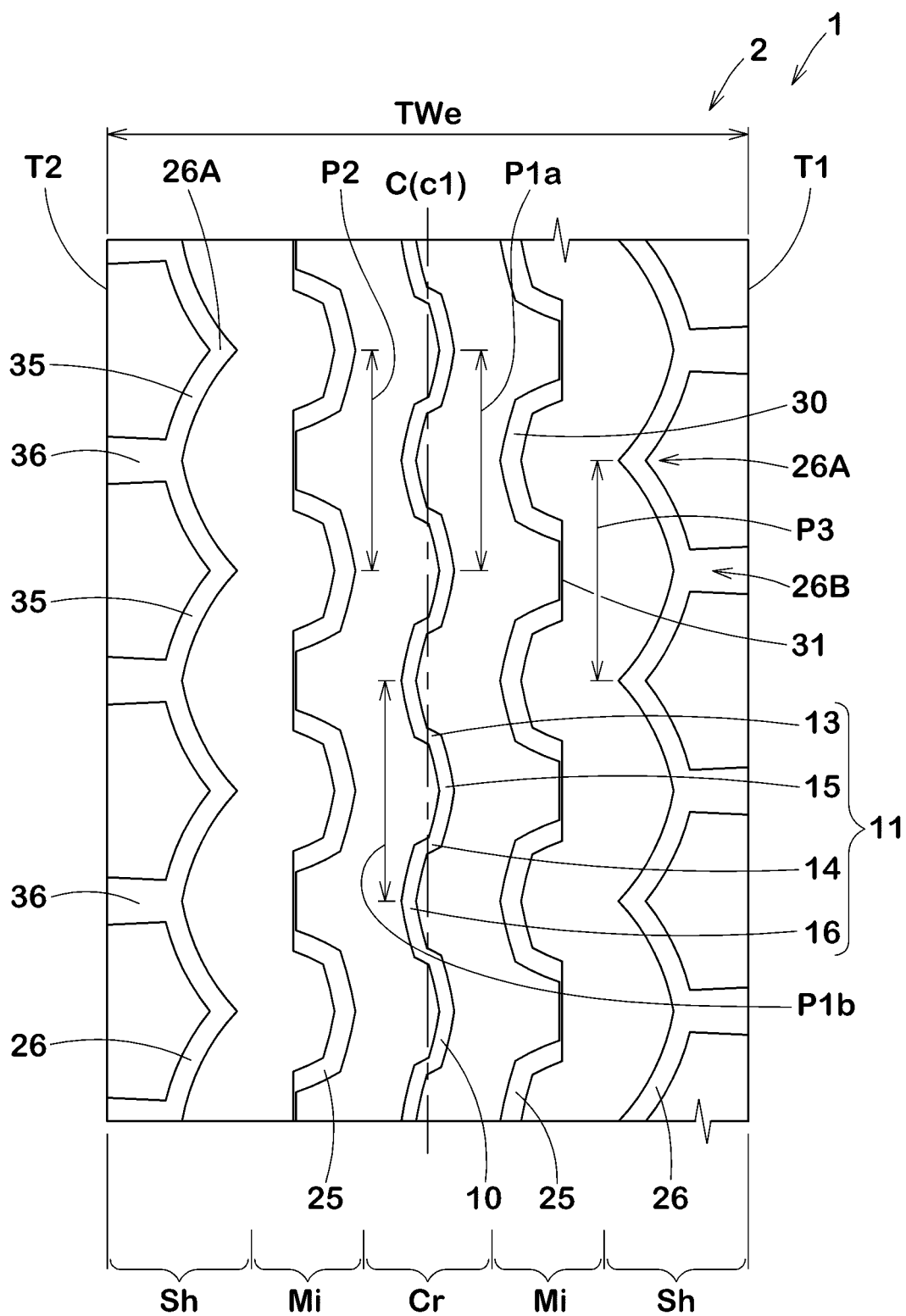
FIG. 2 is a development view of a tread portion of FIG. 1.

FIG. 1 is a lateral cross-sectional view of a tyre 1, in a standard state, showing an embodiment of the present invention. In this embodiment, a pneumatic tyre for a motorcycle is shown as a preferred example of the tyre 1. Note that the present invention is not limited to a pneumatic tyre for a motorcycle, but can also be applied to a pneumatic tyre for a passenger car, for heavy loads, and a pneumatic tyre of other categories, for example. FIG. 2 is a development view of a tread portion 2 of the tyre 1.

The "standard state" is a state in which the tyre 1 is mounted on a standard rim, inflated to a standard inner pressure, and loaded with no tyre load. In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, an outer surface of the tread portion 2 of the tyre 1 in this embodiment, in a lateral cross-sectional view thereof, is curved in an arc shape convex outwardly in a tyre radial direction.

Tyre component members such as a carcass 6, a belt layer 7, a band layer 8, and the like are arranged inside the tyre 1 in this embodiment. Known configurations are appropriately used for these tyre component members. The band layer 8 in this embodiment is formed by band cords (not shown) extending along the tyre circumferential direction.

As shown in FIG. 2, the tread portion 2 is divided into a crown region (Cr), middle regions (Mi), and shoulder regions (Sh). The crown region (Cr) has a center thereof on a tyre equator (C) and has a development width of 25% of a tread development width (Twe). The middle regions (Mi) are arranged adjacently to the crown region (Cr) on both sides thereof, and each has a development width of 17.5% of the tread development width (Twe). One of the shoulder regions (Sh) on a side of is arranged between a first tread edge (T1) and one of the middle regions (Mi) on the side of the first tread edge (T1), and the other one of the shoulder regions (Sh) is arranged between a second tread edge (T2) and one of the middle regions (Mi) on the side of the second tread edge (T2). The crown region (Cr) is the region which comes into contact with a road surface during straightaway driving. The shoulder regions (Sh) are the regions which come into contact with the road surface during running in full-bank.

The tread development width (Twe) is a distance in a tyre axial direction between the first tread edge (T1) and the second tread edge (T2) when the tread portion 2 is developed in a plane. The first tread edge (T1) and the second tread edge (T2) are outermost ground contacting positions in the tyre axial direction of the tread portion 2. In the present specification, for convenience, the first tread edge (T1) is located on the right side of the tyre equator (C), and the second tread edge (T2) is located on the left side of the tyre equator (C).

The tread portion 2 in this embodiment is provided with a crown main groove 10 extending continuously in the tyre circumferential direction. The crown main groove 10 in this embodiment is formed by a plurality of unit patterns 11 arranged repeatedly in the tyre circumferential direction.

Figure 3:
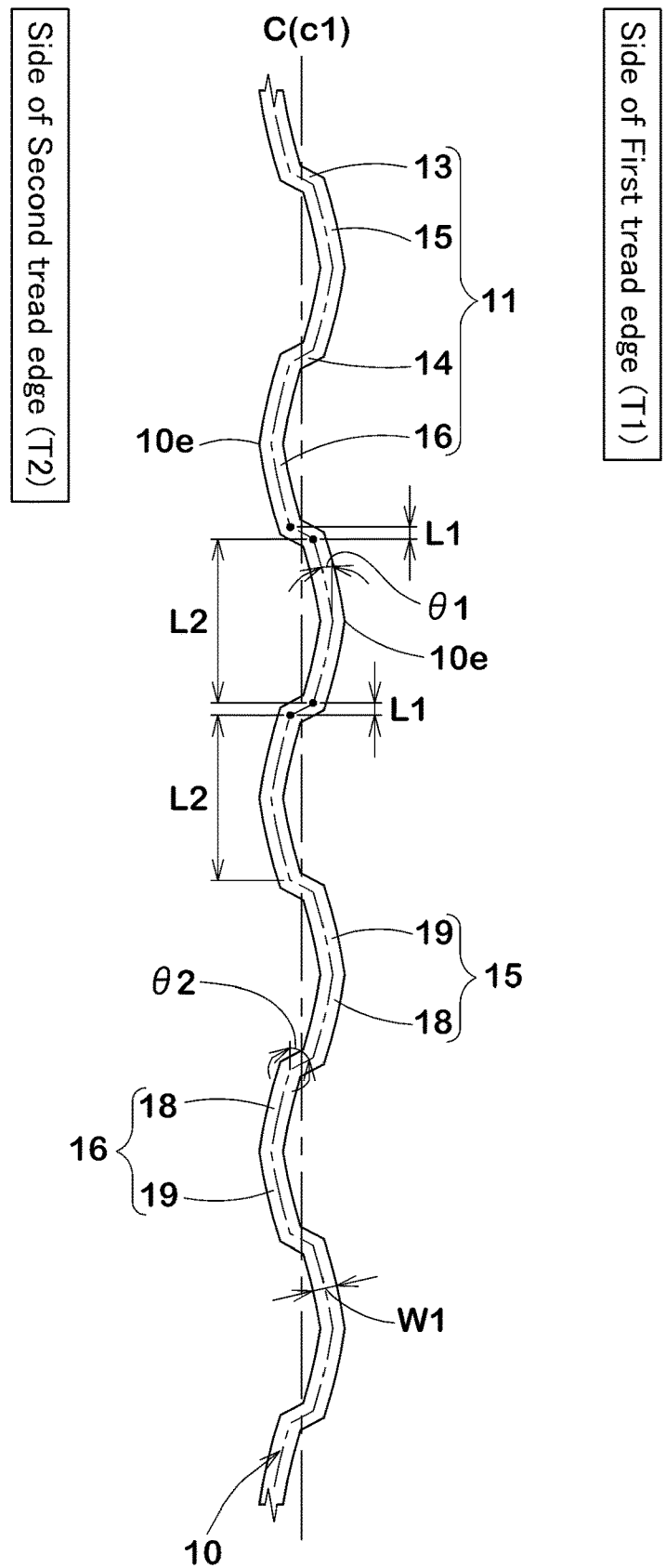
FIG. 3 is an enlarged view of a crown main groove of FIG. 2.

FIG. 3 is an enlarged view of the crown main groove 10. As shown in FIG. 3, each of the unit patterns 11 in this embodiment is formed by a first inclined element 13, a second inclined element 14, a first bent element 15, and a second bent element 16. The first inclined element 13 in this embodiment extends so as to cross a first tyre circumferential direction line (c1) obliquely (upward to the left in the figure). The second inclined element 14 in this embodiment extends so as to cross the first tyre circumferential direction line (c1) obliquely in an opposite direction to the first inclined element 13 (upward to the right in the figure). The first bent element 15 in this embodiment extends so as to connect between the first inclined element 13 and the second inclined element 14. The second bent element 16 in this embodiment is connected with the second inclined element 14. That is, each of the unit patterns 11 in this embodiment is formed by the first inclined element 13, the first bent element 15, the second inclined element 14, and the second bent element 16 arranged in this order from the upper side in the figure.

The first bent element 15 in this embodiment is bent so as to be convex toward the first tread edge (T1) without having a component extending in parallel with the tyre circumferential direction (hereinafter, may sometimes be referred to as "tyre circumferential direction component"). Further, the second bent element 16 in this embodiment is bent so as to be convex toward the second tread edge (T2) without having the tyre circumferential direction component. As just described above, the crown main groove 10 in this embodiment does not include the tyre circumferential direction component. The crown main groove 10 configured as such is prevented from getting engaged with grooves extending in a running direction provided in a rain groove road, for example, therefore, a lane change can be performed smoothly. Further, for example, in the tyre 1 in which the band cords extend in the tyre circumferential direction, the crown main groove 10 and the band cords extend in different directions from each other, therefore, repeated distortion generated during running becomes small.

Each of the first inclined element 13 and the second inclined element 14 has a larger angle with respect to the tyre circumferential direction and a smaller length in the tyre circumferential direction than each of the first bent element 15 and the second bent element 16. That is, the first inclined element 13 and the second inclined element 14 which have larger angles with respect to the tyre circumferential direction are each configured to have a smaller length in the tyre circumferential direction than the first bent element 15 and the second bent element 16. The first inclined element 13 and the second inclined element 14 configured as such suppress the generation of the TGC while enabling a smooth lane change. Further, the first inclined element 13 and the second inclined element 14 having smaller length components in the tyre axial direction suppress generation of pitch sound. The first bent element 15 and the second bent element 16 have large lengths in the tyre circumferential direction but small angles with respect to the tyre circumferential direction, therefore, generation of large pitch noise is suppressed.

In this embodiment, each of the first bent element 15 and the second bent element 16 includes a first portion 18 inclined to one side (upward to the right in the figure) with respect to the tyre circumferential direction and a second portion 19 inclined to the opposite side (upward in the left in the figure) to the first portion 18. The first portion 18 in this embodiment is connected with the second portion 19.

The first portion 18 and the second portion 19 in this embodiment extend linearly. Thereby, the first bent element 15 in this embodiment is formed to be transversely V-shaped convex toward the first tread edge (T1). Further, the second bent element 16 in this embodiment is formed to be transversely V-shaped convex toward the second tread edge (T2). Each of the first bent element 15 and the second bent element 16 configured as such disturbs the vibration of the air flowing through the groove at the connection portion between the first portion 18 and the second portion 19, therefore, it is possible that the noise performance is maintained high.

It is preferred that an angle θ1 with respect to the tyre circumferential direction of each of the first portion 18 and the second portion 19 is 5 degrees or more and 20 degrees or less, for example. If the angle θ1 is less than 5 degrees, it is possible that the effect of suppressing the generation of the TGC is deteriorated. If the angle θ1 is more than 20 degrees, it is possible that the pitch sound due to rolling of the tyre 1 is increased.

Each of the first bent elements 15 and the second bent elements 16 is formed so as not to cross the first tyre circumferential direction line (c1). The crown main groove 10 in this embodiment is formed so as to be point-symmetric with respect to each of intersecting points of the first tyre circumferential direction line (c1) and a groove center line of the crown main groove 10. Note that the crown main groove 10 is not limited to such an embodiment, and it may be configured to be point-asymmetric.

It is preferred that a length (L1) in the tyre circumferential direction of each of the first inclined elements 13 and the second inclined elements 14 is 5% or more and 15% or less of a length (L2) in the tyre circumferential direction of each of the first bent elements 15 and the second bent elements 16. Thereby, it is possible that the steering stability performance is improved and that the generation of the TGC is suppressed while the noise performance is maintained in a good balance.

Each of the first inclined elements 13 and the second inclined elements 14 in this embodiment extends linearly. Note that the first inclined elements 13 and the second inclined elements 14 are not limited to such an embodiment, and they may each be configured to extend in an arc shape.

Although not particularly limited, it is preferred that an angle θ2 of each of the first inclined elements 13 and the second inclined elements 14 is about 45 degrees or more and about 75 degrees or less, for example. Thereby, it is possible that the vibration of the air in the crown main groove 10 is disturbed at the connection points of the first bent elements 15 and the first inclined elements 13 and the connection points of the second bent elements 16 and the second inclined elements 14. Further, it is possible that the increase of the pitch sound generated by the first inclined elements 13 and the second inclined elements 14 is suppressed.

It is preferred that the first tyre circumferential direction line (c1) is positioned on the tyre equator (C). The crown main groove 10 in this embodiment is formed so as to be point-symmetric with respect to each of the intersecting points of the first tyre circumferential direction line (c1) and the groove center line of the crown main groove 10. Thereby, it is possible that a smooth lane change is performed in transitions from straightaway driving to cornering both to the right and to the left.

The crown main groove 10 has both ends (10e) thereof in the tyre axial direction arranged in the crown region (Cr) which comes into contact with the ground during straightaway driving. Thereby, when running on a rain groove road in which grooves for drainage are provided, the above-mentioned grooves and the crown main groove 10 are suppressed from getting engaged with each other, for example. In particular, it is preferred that the both ends (10e) of the crown main groove 10 are arranged at positions within 10% of the tread development width (Twe) from the tyre equator (C) to the outer side in the tyre axial direction. Each of the ends (10e) of the crown main groove 10 in this embodiment is formed at a connection position between the first portion 18 and the second portion 19 of a respective one of the first bent elements 15 and the second bent elements 16. Note that it is preferred that the outer ends (10e) of the crown main groove 10 in this embodiment are arranged at positions spaced away from the tyre equator (C) to the outer side in the tyre axial direction by 4% or more of the tread development width (Twe). Thereby, length components in the tyre axial direction of the crown main groove 10 are ensured, therefore, it is possible that deflection during running is suppressed in the crown region (Cr) to which large ground contact pressure is applied.

The crown main groove 10 in this embodiment is configured to have a constant groove width (w1) without varying in the tyre circumferential direction. Note that the crown main groove 10 is not limited to such an embodiment and the groove width (w1) may vary. In this specification, the term "groove width" means a length of a groove in a direction perpendicular to a groove center line thereof extending in a length direction thereof.

Although not particularly limited, it is preferred that the groove width (w1) of the crown main groove 10 is 1% or more and 4% or less of the tread development width (Twe), for example.

As shown in FIG. 2, the crown region (Cr) in this embodiment is provided with only the crown main groove 10 and not provided with other grooves. Thereby, the rigidity decrease of the crown region (Cr) is suppressed, therefore, high steering stability performance is exerted. In this specification, the term "groove" means a groove having a groove width of 1.5 mm or more.

The tread portion 2 in this embodiment is further provided with middle main grooves 25 and shoulder main grooves 26 extending continuously in the tyre circumferential direction. The middle main grooves 25 in this embodiment are arranged on both outer side in the tyre axial direction of the crown main groove 10. Each of the middle main grooves 25 in this embodiment is arranged in its entirety in a respective one of the middle regions (Mi). Each of the shoulder main grooves 26 in this embodiment is arranged on the outer side in the tyre axial direction of a respective one of the middle main grooves 25. Note that the tyre 1 of the present invention is not limited to such an embodiment.

Figure 4:
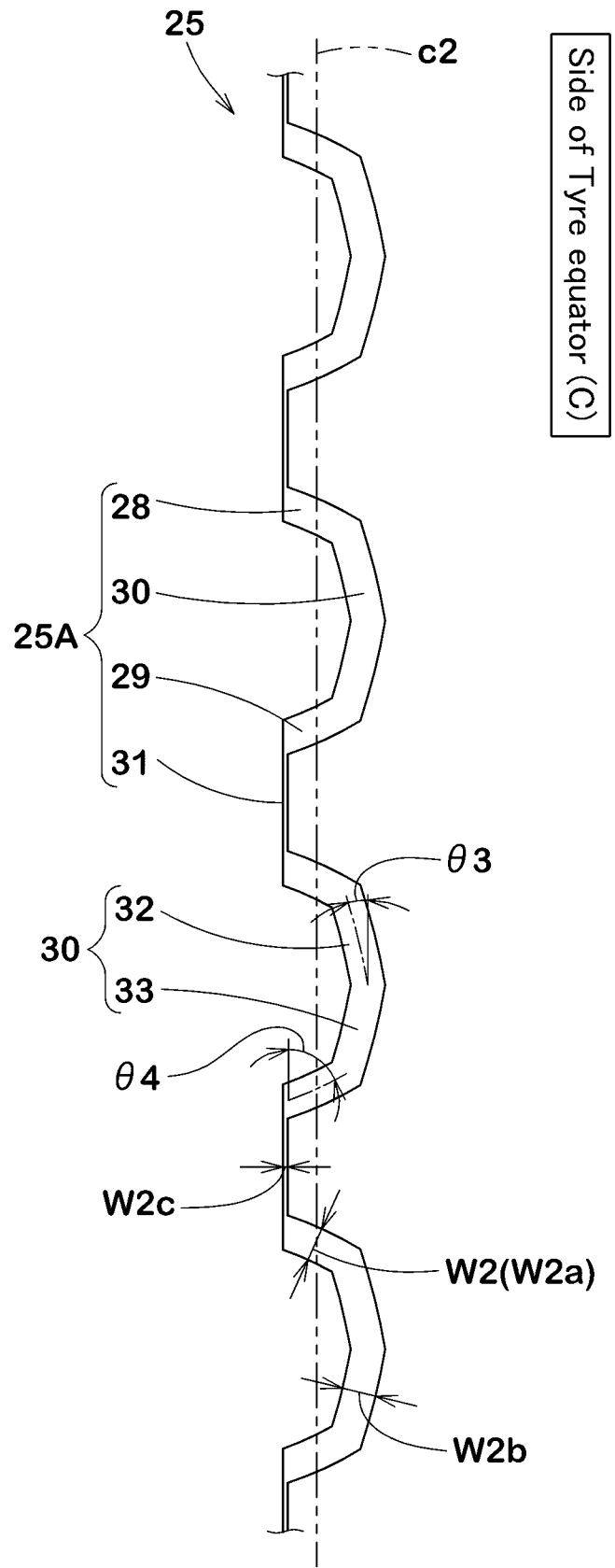
FIG. 4 is an enlarged view of one of middle main grooves of FIG. 2.

FIG. 4 is an enlarged view of one of the middle main grooves 25 on the right side of FIG. 2. As shown in FIG. 4, the middle main grooves 25 in this embodiment is formed by a plurality of unit patterns (25A) arranged repeatedly in the tyre circumferential direction. Note that the middle main groove 25 on the right side of FIG. 2 is configured in the same manner as the middle main groove 25 on the left side, therefore, the detailed description thereof is omitted.

Each of the unit patterns (25A) is formed by a middle first inclined element 28, a middle second inclined element 29, a middle bent element 30, and a linear element 31. The middle first inclined element 28 in this embodiment extends so as to cross a second tyre circumferential direction line (c2) obliquely (upward to the left in the figure). The middle second inclined element 29 in this embodiment extends so as to cross the second tyre circumferential direction line (c2) obliquely in an opposite direction to the middle first inclined element 28 (upward to the right in the figure). The middle bent element 30 in this embodiment extends so as to connect between the middle first inclined element 28 and the middle second inclined element 29. The linear element 31 in this embodiment is connected with the middle second inclined element 29. As just described above, each of the unit patterns (25A) in this embodiment is formed by the middle first inclined element 28, the middle bent element 30, the middle second inclined element 29, and the linear element 31 arranged in this order from the upper side in the figure.

The middle bent element 30 in this embodiment includes a middle first portion 32 inclined to one side with respect to the tyre circumferential direction and a middle second portion 33 inclined to an opposite direction to the middle first portion 32. The middle second portion 33 in this embodiment is connected with the middle first portion 32.

Each of the middle first portion 32 and the middle second portion 33 in this embodiment extends linearly. That is, the middle bent element 30 is formed to be transversely V-shaped convex in the tyre axial direction toward the tyre equator (C). It is possible that each of the middle bent elements 30 configured as such disturbs the vibration of the air flowing in a respective one of the middle main grooves 25 at the connection portion between the middle first portion 32 and the middle second portion 33. Note that each of the middle first portions 32 and the middle second portions 33 may be configured to extend in an arc shape.

It is preferred that an angle θ3 with respect to the tyre circumferential direction of each of the middle first portions 32 and the middle second portions 33 is 5 degrees or more and 20 degrees or less, for example. Thereby, the pitch sound due to the rolling of the tyre 1 can be decreased and the generation of the TGC can be suppressed. It is preferred that an angle θ4 with respect to the tyre circumferential direction of each of the middle first inclined element 28 and the middle second inclined element 29 is 50 degrees or more and 80 degrees or less.

Each of the linear elements 31 in this embodiment extends along the tyre circumferential direction. That is the linear elements 31 do not have the length components in the tyre axial direction, therefore, generation of the pitch sound is suppressed. Further, each of the linear elements 31 configured as such disturbs the vibration of the air in a respective one of the middle main grooves 25 at the connection portion with a respective one of the middle second inclined elements 29. Furthermore, the linear elements 31 are arranged in the middle regions (Mi) which come into contact with the ground during cornering, therefore, even when running on a rain groove road, the linear elements 31 are less likely to get engaged with the grooves for drainage on the road surface, thereby, stability during a lane change is maintained high, for example.

The linear elements 31 are arranged outermost in the tyre axial direction among the elements of the middle main grooves 25. Thereby, the linear elements 31 come into contact with the ground during cornering with a large camber angle, therefore, the engagement of the linear elements 31 and the grooves of the rain groove road is further suppressed.

A groove width (w2c) of each of the linear elements 31 in this embodiment is configured to be the smallest among the groove width (w1) of the crown main groove 10 and a groove width (w2) (that is the groove widths w2a, w2b, and w2c) of each of the middle main grooves 25. Thereby, the rigidity of the land regions in the vicinity of the linear elements 31 is maintained high, therefore, it is possible that the generation of the TGC is suppressed more effectively.

In order to effectively exert the above-described effects, it is preferred that the groove width (w2c) of each of the linear elements 31 is 5% or more and 30% or less of a groove width (w2b) of each of the middle bent elements 30. Further, it is preferred that a groove depth (not shown) of each of the linear elements 31 is 50% or more and 90% or less of a groove depth (not shown) of each of the middle bent elements 30.

A groove width (w2a) of each of the middle first inclined elements 28 and the middle second inclined elements 29 and the groove width (w2b) of each of the middle bent elements 30 are each larger than the groove width (w1) of the crown main groove 10. That is, by having the groove width (w1) of the crown main groove 10 smaller, the land region rigidity of the crown region (Cr) is relatively high, therefore, a stable lane change is possible.

As shown in FIG. 2, a pitch (P2) of the middle bent elements 30 of the middle main grooves 25 in this embodiment is equal to a pitch (P1a) of the first bent elements 15 or a pitch (P1b) of the second bent elements 16 of the crown main groove 10. In the embodiment shown in FIG. 2, each of the middle bent elements 30 of the middle main groove 25 on the left side is formed at the same position in the tyre circumferential direction as a respective one of the first bent elements 15. Further, each of the middle bent elements 30 of the middle main groove 25 on the right side is formed at the same position in the tyre circumferential direction as a respective one of the second bent elements 16. Thereby, with respect to a length in the tyre axial direction of each of the land regions formed between the crown main groove 10 and the middle main grooves 25, a variation along the tyre circumferential direction is maintained low, therefore, excellent uneven wear resistance performance is exerted.

Each of the shoulder main grooves 26 in this embodiment is formed by a plurality of shoulder arc portions 35 arranged in the tyre circumferential direction. Each of the shoulder arc portions 35 is formed to be bent so as to be convex toward the outer side in the tyre axial direction. The shoulder main grooves 26 in this embodiment are formed so as not to have a component extending in parallel with the tyre circumferential direction. It is possible that the shoulder main grooves 26 configured as such effectively disturb the vibration of the air in the shoulder main grooves 26.

Each of the shoulder main grooves 26 in this embodiment is formed by the shoulder arc portions 35 connected in a chain, therefore, it contains inward protruding portions (26A) each convex toward the tyre equator (C) and outward protruding portions (26B) each convex axially outwardly so as to include an axially outermost point of a respective one of the shoulder arc portions 35. The inward protruding portions (26A) and the outward protruding portions (26B) in this embodiment are arranged alternately in the tyre circumferential direction.

A pitch (P3) of the inward protruding portions (26A) of each of the shoulder main grooves 26 in this embodiment is equal to the pitch (P2) of the middle bent element 30 of the middle main groove 25 respectively adjacent to the shoulder main groove 26. In the embodiment shown in FIG. 2, each of the inward protruding portions (26A) is formed at the same position in the tyre circumferential direction as a respective one of the middle bent element 30. Further, each of the outward protruding portions (26B) of each of the shoulder main grooves 26 is formed at the same position in the tyre circumferential direction as a respective one of the linear elements 31 arranged axially outermost of the middle main groove 25 respectively adjacent to the shoulder main groove 26. Thereby, with respect to a length in the tyre axial direction of the land region defined between each of the middle main grooves 25 and its adjacent one of the shoulder main grooves 26, a variation along the tyre circumferential direction is maintained low, therefore, excellent uneven wear resistance performance is exerted.

The tread portion 2 in this embodiment is provided with a plurality of shoulder lateral grooves 36 each connecting between one of the shoulder main grooves 26 and the first tread edge (T1) or the second tread edge (T2). Each of the shoulder lateral grooves 36 in this embodiment extends along the tyre axial direction. The shoulder lateral grooves 36 configured as such ensure high rigidity in the tyre axial direction of the land regions forming the shoulder regions (Sh) to which large lateral force is applied, therefore, stable cornering is possible.

Each of the shoulder lateral grooves 36 in this embodiment is connected with the outward protruding portion (26B) of a respective one of the shoulder arc portions 35. Each of the shoulder lateral grooves 36 configured as such has a small length in the tyre axial direction, therefore, the effects described above are exerted effectively.

Figure 5:
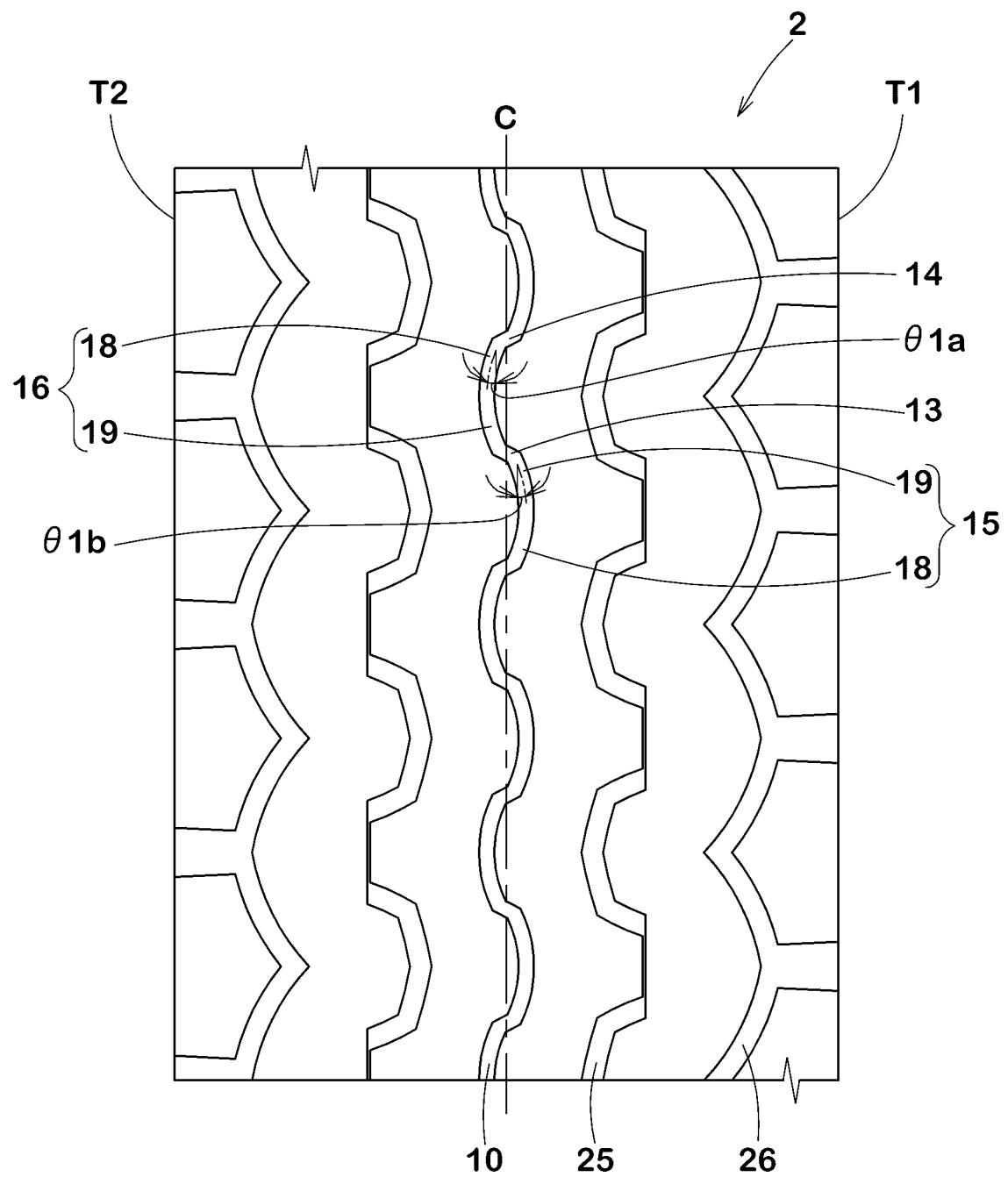
FIG. 5 is a development view of the tread portion according to another embodiment.

FIG. 5 is a development view of the tread portion 2 of another embodiment. The same reference numerals are given to the elements common to those of the tread portion 2 in the embodiment described above, and the explanations thereof are omitted here. As shown in FIG. 5, each of the first bent element 15 and the second bent element 16 of the crown main groove 10 in this embodiment has the first portion 18 and the second portion 19 each extending in an arc shape. Further, each of the first inclined elements 13 and the second inclined elements 14 obliquely crosses the first tyre circumferential direction line (c1). Thereby, the crown main groove 10 in this another embodiment does not have a component extending in parallel with the tyre circumferential direction, therefore, it is possible that a lane change is performed smoothly and that the generation of the TGC is suppressed.

In each of the first bent elements 15 and the second bent elements 16, the first portion 18 and the second portion 19 are connected smoothly with each other. That is an angle ($\theta 1a$) with respect to the tyre circumferential direction of each of the first portions 18 is gradually decreased as it goes toward a respective one of the second portions 19. An angle ($\theta 1b$) with respect to the tyre circumferential direction of each of the second portion 19 is gradually decreased as it goes toward a respective one of the first portion 18.

While detailed description has been made of the tyre as an embodiment of the present invention, it is needless to say that the present invention can be embodied in various forms without being limited to the illustrated embodiments.

WORKING EXAMPLES (EXAMPLES)

Pneumatic tyres for a motorcycle having the basic structure shown in FIG. 1 and the basic pattern shown in FIG. 2 were made by way of test according to the specifications listed in Table 1, then each of the test tyres was tested for the steering stability performance on a soft road and a hard road, and block chipping. Common specifications of the test tyres and the test methods were as follows.

<Noise Performance and Steering Stability Performance>

A test vehicle described below with each of the test tyres mounted thereon was driven by a test rider on a dry asphalt road surface including rain grooves of a test course. During the test drive, the noise performance related to the noise generated by the tyre and the steering stability performance related to grip and the stability during a lane change were evaluated by the test driver by the feeling. The results are indicated by an evaluation point with the highest point of 5.

Tyre: 180/55R17
Tyre rim: MT5.50×17
Tyre inner pressure: 290 kPa
Test vehicle: a motorcycle with displacement of 1300 cc <TGC Suppression Performance>

After the test driver drove the test vehicle described above for a distance of 5000 kilometers on the test course described above, the generation of the TGC was observed. Evaluation of the TGC suppression performance was performed based on presence or absence of the generation of the TGC confirmed by the test driver's visual observation. Regarding the test results, the larger numerical value is better. The test results and the like are shown in Table 1.

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Angle $\theta 1$ of First bent element and second bent element [degree] | 0 | 40 | 15 | 15 | 5 | 20 | 15 | 15 | 15 | 15 |
| Angle $\theta 2$ of First inclined element and Second inclined element [degree] | 60 | 40 | 15 | 60 | 60 | 60 | 60 | 60 | 60 | 60 |
| Groove width (W2c) of Linear element/Groove width (W2b) of Middle bent element [%] | 15 | 15 | 15 | 15 | 15 | 15 | 5 | 30 | 15 | 15 |
| Groove depth of Linear element/Groove depth of Middle bent element [%] | 70 | 70 | 70 | 70 | 70 | 70 | 70 | 70 | 50 | 90 |

TABLE 1-continued

|  | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Noise performance [evaluation point: on a scale of 1 to 5] | 3 | 2 | 2 | 3 | 4 | 3 | 3 | 3 | 3 | 3 |
| Steering stability performance [evaluation point: on a scale of 1 to 5] | 3 | 4 | 3 | 5 | 4 | 5 | 4 | 5 | 4 | 5 |
| TGC suppression performance [Presence (P) or Absence (A) of TGC] | P | A | A | A | A | A | A | A | A | A |

From the test results, it was confirmed that the tyres in Examples in Table 1 maintained the noise performance, exerted excellent steering stability performance, and suppressed the generation of the TGC compared with the tyres in References in Table 1.

The invention claimed is:

1. A tyre comprising a tread portion comprising a first tread edge and a second tread edge, wherein
the tread portion includes a crown main groove extending continuously in a tyre circumferential direction and a middle main groove arranged on an outer side in a tyre axial direction of the crown main groove and extending continuously in the tyre circumferential direction,
the crown main groove is formed by unit patterns arranged repeatedly in the tyre circumferential direction,
each of the unit patterns is formed by a crown first inclined element, a crown second inclined element, a crown first bent element, and a crown second bent element,
the crown first inclined element extends so as to cross a first tyre circumferential direction line obliquely,
the crown second inclined element extends so as to cross the first tyre circumferential direction line obliquely in a direction opposite to the crown first inclined element,
the crown first bent element extends so as to connect between the crown first inclined element and the crown second inclined element,
the crown second bent element is connected with the crown second inclined element,
each of the crown first inclined element and the crown second inclined element has a larger angle with respect to the tyre circumferential direction and a smaller length in the tyre circumferential direction than each of the crown first bent element and the crown second bent element,
the crown first bent element is bent so as to be convex toward the first tread edge without having a component extending in parallel with the tyre circumferential direction,
the crown second bent element is bent so as to be convex toward the second tread edge without having the component extending in parallel with the tyre circumferential direction,
the middle main groove is formed by unit patterns arranged repeatedly in the tyre circumferential direction,
each of the unit patterns of the middle main groove is formed by a middle first inclined element, a middle second inclined element, a middle bent element, and a middle linear element,
the middle first inclined element extends so as to cross a second tyre circumferential direction line obliquely,
the middle second inclined element extends so as to cross the second tyre circumferential direction line obliquely in a direction opposite to the middle first inclined element,
the middle bent element extends so as to connect between the middle first inclined element and the middle second inclined element,
the middle linear element is connected with the middle second inclined element,
the middle bent element is bent so as to be convex toward the crown main groove, and
the middle linear element extends along the tyre circumferential direction.

2. The tyre according to claim 1, wherein each of the crown first bent element and the crown second bent element includes a crown first portion inclined to one side with respect to the tyre circumferential direction and a crown second portion inclined to a side opposite to the first portion.

3. The tyre according to claim 2, wherein each of the crown first portion and the crown second portion extends linearly.

4. The tyre according to claim 2, wherein each of the crown first portion and the crown second portion extends in an arc shape.

5. The tyre according to claim 2, wherein an angle with respect to the tyre circumferential direction of each of the crown first portion and the crown second portion is 5 degrees or more and 20 degrees or less.

6. The tyre according to claim 1, wherein the first tyre circumferential direction line is positioned on a tyre equator.

7. The tyre according to claim 1, wherein the middle bent element includes a middle first portion inclined to one side with respect to the tyre circumferential direction and a middle second portion inclined to a side opposite to the middle first portion.

8. The tyre according to claim 7, wherein each of the middle first portion and the middle second portion extends linearly.

9. The tyre according to claim 7, wherein an angle with respect to the tyre circumferential direction of each of the middle first portion and the middle second portion is 5 degrees or more and 20 degrees or less.

10. The tyre according to claim 1, wherein a groove width of the middle linear element is the smallest among groove widths of the crown main groove and the middle main groove.

11. The tyre according to claim 1, wherein a groove width of the middle linear element is 5% or more and 30% or less of a groove width of the middle bent element.

12. The tyre according to claim 1, wherein the crown main groove is point-symmetric with respect to each of intersecting points of the first tyre circumferential direction line and a groove center line of the crown main groove.

13. The tyre according to claim 1, wherein a length in the tyre circumferential direction of each of the crown first inclined element and the crown second inclined element is 5% or more and 15% or less of a length in the tyre circumferential direction of the crown first bent element and the crown second bent element.

14. The tyre according to claim 1, wherein an angle of each of the crown first inclined element and the crown second inclined element is 45 degrees or more and 75 degrees or less with respect to the tyre circumferential direction.

15. The tyre according to claim 1, wherein both ends in a tyre axial direction of the crown main groove are arranged at positions within 10% of a tread development width from a tyre equator to an outer side in the tyre axial direction and spaced away from the tyre equator to the outer side in the tyre axial direction by 4% or more of the tread development width.

16. The tyre according to claim 1, wherein the crown main groove has a constant groove width of 1% or more and 4% or less of a tread development width.

17. The tyre according to claim 1, wherein an angle of each of the middle first inclined element and the middle second inclined element is 50 degrees or more and 80 degrees or less with respect to the tyre circumferential direction.

18. The tyre according to claim 1, wherein each of a groove width of the middle first inclined element, a groove width of the middle second inclined element, and a groove width of the middle bent element is larger than a groove width of the crown main groove.

19. The tyre according to claim 1, wherein a pitch of the middle bent elements of the middle main groove is equal to a pitch of the crown first bent elements or a pitch of the crown second bent elements of the crown main groove.

* * * * *